US007814814B2

(12) United States Patent
Whitehead

(10) Patent No.: US 7,814,814 B2
(45) Date of Patent: Oct. 19, 2010

(54) TOOL KIT FOR REMOVAL OF BROKEN SPARK PLUGS

(75) Inventor: Michael L. Whitehead, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 12/103,240

(22) Filed: Apr. 15, 2008

(65) Prior Publication Data

US 2009/0255384 A1 Oct. 15, 2009

(51) Int. Cl.
*B25B 13/46* (2006.01)
*B23P 19/04* (2006.01)

(52) U.S. Cl. ....................................... 81/53.2; 29/426.1

(58) Field of Classification Search .................. 81/53.2, 81/52; 29/426.1
See application file for complete search history.

(56) References Cited

U.S. PATENT DOCUMENTS 2,547,986 A * 4/1951 Van Dermark et al. ..... 29/426.4
2,589,935 A * 3/1952 Guisti .......................... 81/125
2,670,639 A * 3/1954 Flowers et al. ................ 408/54
3,305,921 A * 2/1967 Morse .......................... 29/229
D354,665 S * 1/1995 Greenland et al. ............. D8/51
6,640,673 B1 * 11/2003 Ploeger et al. ................ 81/447
2008/0190245 A1 * 8/2008 Badman et al. ................ 81/52

OTHER PUBLICATIONS

Idea Disclosure Agreement No. 05-362 dated Aug. 21, 2005 by Mike Smith for a spark plug.
Idea Disclosure Agreement No. 07-421 dated Sep. 11, 2007 by Kevin Blair for a spark plug electrode removal tool.
www.pten.com, Cal-Van's Ford spark plug extractor.
www.motoralldata.com, Technical Service Bulletin, TSB 06-15-2, Feb. 20, 2008, Ignition System—Spark Plug Removal Instructions.

* cited by examiner

*Primary Examiner*—David B Thomas
(74) *Attorney, Agent, or Firm*—Banner & Witcoff, Ltd

(57) ABSTRACT

A kit for removal of a broken spark plug from a cylinder head includes first and second tools. The first tool is designed to position a broken porcelain element into the spark plug tip so that the second tool may be utilized to engage the tip by threading into the tip and thereafter axially withdraw the plug tip from the cylinder head by rotation of the tool.

18 Claims, 5 Drawing Sheets

20
22
24
26
28
30
32
34
36
38
40
46

TOOL KIT FOR REMOVAL OF BROKEN SPARK PLUGS

BACKGROUND OF THE INVENTION

In a principal aspect the present invention relates to a kit comprised of tools to effect removal of broken spark plugs from a cylinder head.

Motor vehicle internal combustion engines include spark plugs threaded into the cylinder head so as to provide an electric ignition spark to ignite combustible gasses within each cylinder. Each spark plug has an outer contact connected to a current source. The outer contact connects to a conductor leading to a spark gap at the tip of the plug. Thus ignition is effected by means of a spark in the gap at the tip which projects through the cylinder head into the cylinder.

Spark plugs utilized for such ignition have a variety of constructions. Typically, a spark plug will include an axial conductor encased in a porcelain insulator, an outer end contact terminal and a threaded cylindrical body which encases the parts of the spark plug and enables threaded insertion and removal of the plug from a threaded bore in the cylinder head.

Recently, at least one vehicle manufacturer has adopted a spark plug construction which is somewhat difficult to remove from the cylinder head and which on occasion will break during removal. Thus, the problem of removal and replacement of spark plugs from the cylinder head is exacerbated by the design of the plug and the manner in which the plug is inserted into the cylinder head. This issue is especially prevalent in certain Ford Motor Company vehicles and is described in a Technical Service Bulletin #TSB 06-15-2 of the Ford Motor Company. That Technical Service Bulletin is incorporated herewith by reference inasmuch as it defines a problem associated with spark plug replacement and also suggests a solution to effect removal of spark plugs, and, in particular, broken spark plugs from the cylinder head of a motor vehicle engine.

Specifically, during attempted removal of a plug, the cylindrical spark plug tip may break and separate from the body of the threaded plug. As such, the tip remains positioned within the cylinder head and must be removed before a new plug can be threaded into the cylinder head. Such removal is exceedingly difficult. A tool which has been used to effect removal of the broken tip forms threads or is tapped into the tip. The tool is thus screwed into the plug tip and the threading tool and attached tip are then pulled from the cylinder head. While this approach is useful, it is exceedingly time consuming, and, moreover, aligning the tool and effecting a successful threading operation is difficult. Finally, a porcelain sleeve retained within the tip may preclude appropriate retrieval of the spark plug tip. Thus, there has developed a need to provide a tool or a set of tools which will address the various issues associated with the removal of a broken spark plug from the cylinder head of a motor vehicle, and, in particular, from the cylinder head of vehicles of the type described in the Technical Service Bulletin referenced above.

SUMMARY OF THE INVENTION

Briefly, the present invention comprises a tool kit which includes first and second tools. The first tool is designed to position a broken porcelain insert of a broken spark plug within a tubular, metal, spark plug tip of the broken spark plug that is residing within the cylinder head of a motor vehicle. That is, the threaded body of the spark plug has already been removed from the cylinder head by unscrewing the body of the plug. During the unscrewing and removal operation, the spark plug will break into two parts: (1) the threaded body which is removed, and (2) the broken tubular tip and porcelain insert retained in the tubular tip which remain in the head. A porcelain insert or element and the tubular tip of the spark plug thus remain within the cylinder head. The first tool in the kit is designed to be threaded into the spark plug socket in the cylinder head and then manipulated to push the porcelain element into the annular, cylindrical tip. Thus, the first tool is comprised of a hollow, tubular member with an elongate, central rod threadably inserted and having a pin projectable from one end of the tubular member. The pin is sized and configured to enable engagement with the porcelain element in the tubular tip of the spark plug and upon axial movement of the rod, drive the porcelain element into the tubular tip of the plug residing in the cylinder head. Upon positioning the porcelain element within the tubular tip, the first tool is removed or unthreaded from the cylinder head, and the second tool is positioned in axial alignment with the spark plug tip residing in the spark plug opening or socket in the cylinder head.

The second tool is comprised of a hollow cylindrical body member with an elongate, center axial rod that is tapered and threaded at the leading end cylindrical tip of the plug and may be axially screwed directly into the hollow tubular tip. The second tool further includes a thread pattern at its outer end that enables the attachment of a nut at the outer end of the rod which can be turned to effect reverse axial movement of the central rod into the body member in which it is housed. In this manner, the central rod which grips the tubular spark plug tip are simultaneously withdrawn. Thereafter, the second tool with the tubular tip attached thereto may be easily removed from the cylinder head and a new spark plug replaced or threaded into the spark plug socket of the cylinder head.

In some circumstances, the first tool need not be required and the process of removal of the hollow metal spark plug tip may be effected by utilizing only the second tool. Thus, if the porcelain element does not interfere with the utilization of the second tool, the second tool alone may be utilized.

Consequently, it is an object of the invention to provide an improved kit of tools which may be utilized for removal of spark plug elements that have been damaged or broken and remain in a cylinder head.

Another object of the invention is to provide a kit of tools which ensures that the tools will be axially aligned with the damaged spark plug element so that upon removal of the damaged portion of the spark plug from a cylinder head, the threads of the spark plug opening or socket in the cylinder head will not be damaged.

Another object of the invention is to provide a plug removal kit for broken spark plug elements in a cylinder head comprised of tools that are easy to use, and which can efficiently and effectively be utilized to remove broken spark plug elements in a very timely manner.

A further object of the invention is to provide a tool kit for removal of broken spark plug elements located in a cylinder head wherein those elements include a hollow, tubular metal tip of the plug with a portion of a porcelain insulator in the metal tip, said kit including a first tool for pushing the porcelain insulator portion of the spark plug into the hollow metal tip and a second tool for threadably connecting with the inside of the end of the hollow metal tip and subsequent extraction from the cylinder head by substantially axial movement outward from the spark plug socket or opening.

These and other objects, advantages and features of the invention will be set forth in the detailed description as follows:

BRIEF DESCRIPTION OF THE DRAWING

In the detailed description which follows, reference will be made to the drawing comprised of the following figures.

DESCRIPTION OF EMBODIMENT OF THE INVENTION

Figures 1, 1A, 2:
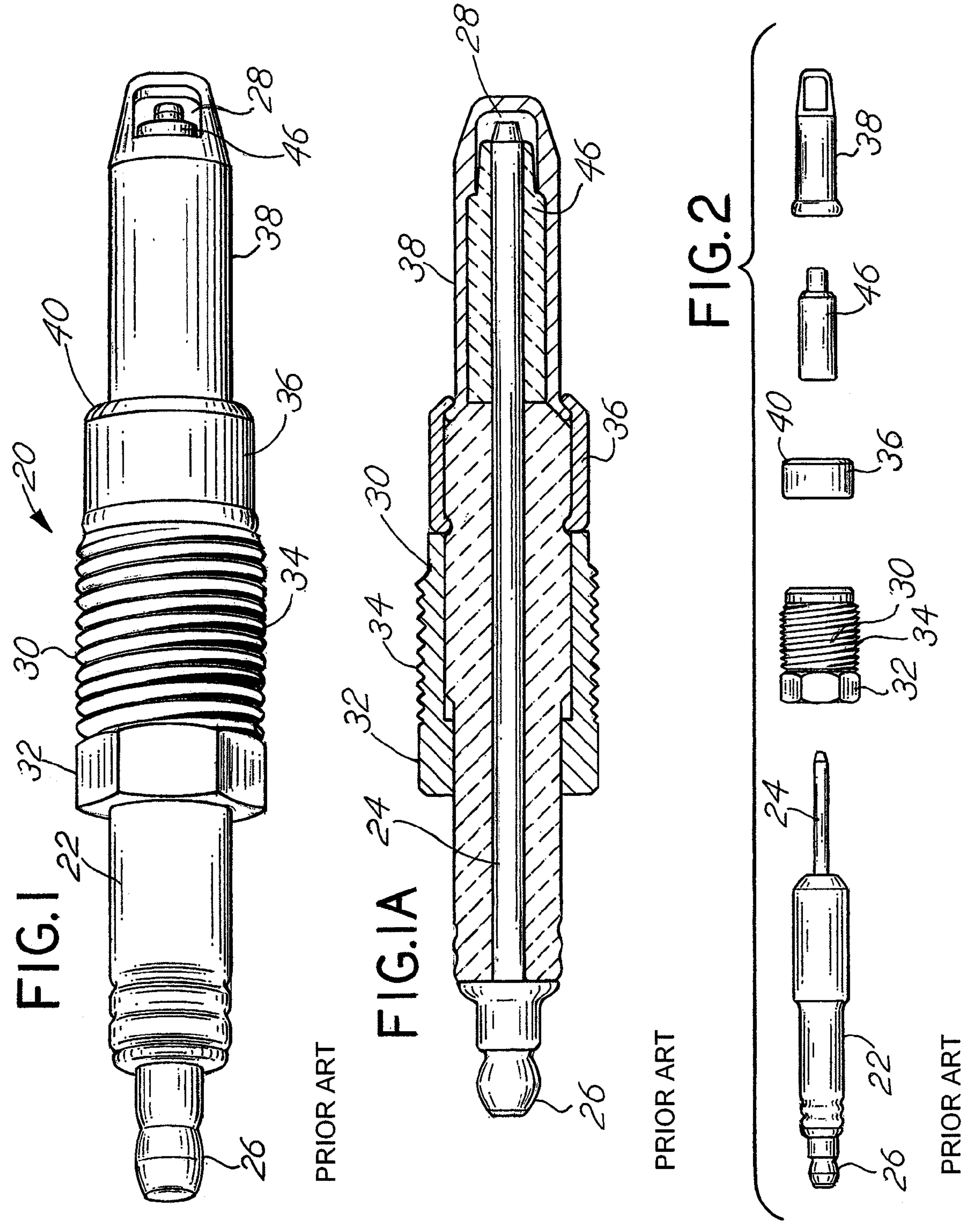
FIG.1 PRIOR ART
FIG.1A PRIOR ART
FIG.2 PRIOR ART
FIG. 1 is an isometric view of a spark plug which is made for utilization in a cylinder head and which has a construction that may break into separate plug elements during removal from a cylinder head.
FIG. 1A is a cross sectional view of the spark plug of FIG. 1.
FIG. 2 is an exploded side view of the spark plug of FIG. 1.
Figure 3:
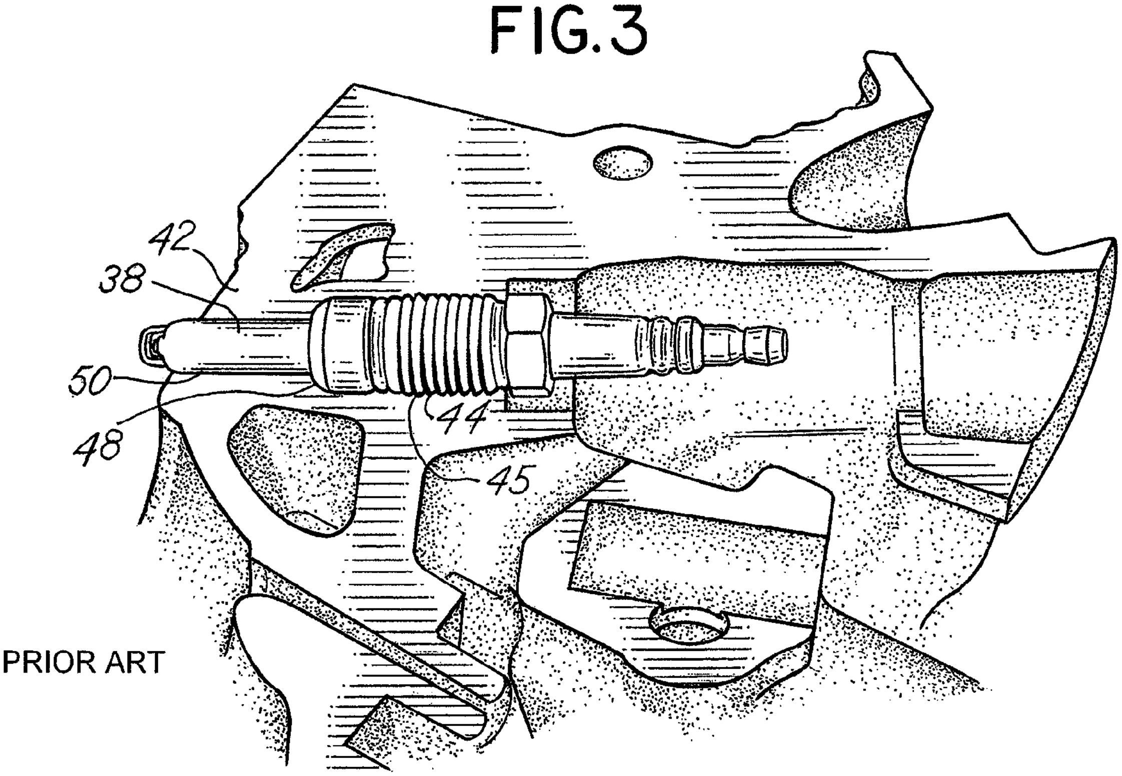
FIG. 3 is a cutaway isometric view of a cylinder head illustrating the position of a spark plug of the type depicted in FIG. 1.
Figure 4:
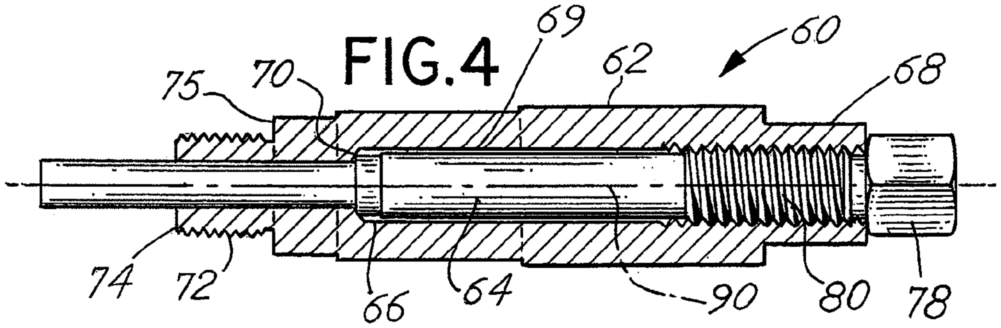
PRIOR ART FIG.4
FIG. 4 is a cross sectional view of a first tool from the kit of the invention which is designed to position a broken ceramic or porcelain portion or element of the spark plug of FIGS. 1, 1A and 2 within the hollow, cylindrical tip of the spark plug.
Figure 5:
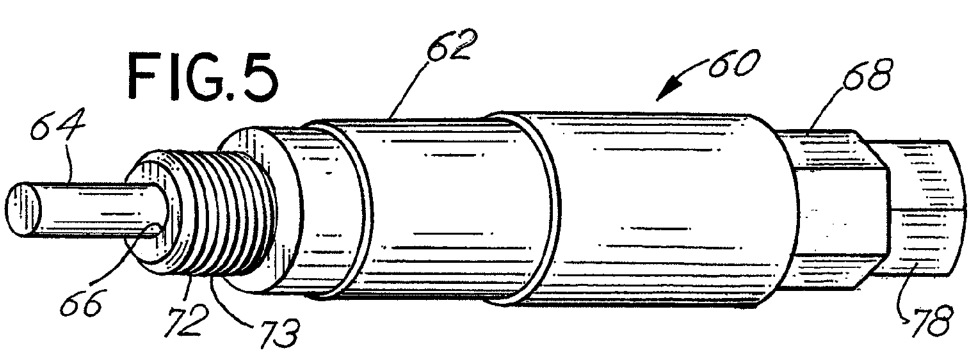
FIG. 5 is an isometric view of the tool of FIG. 4.
Figure 6:
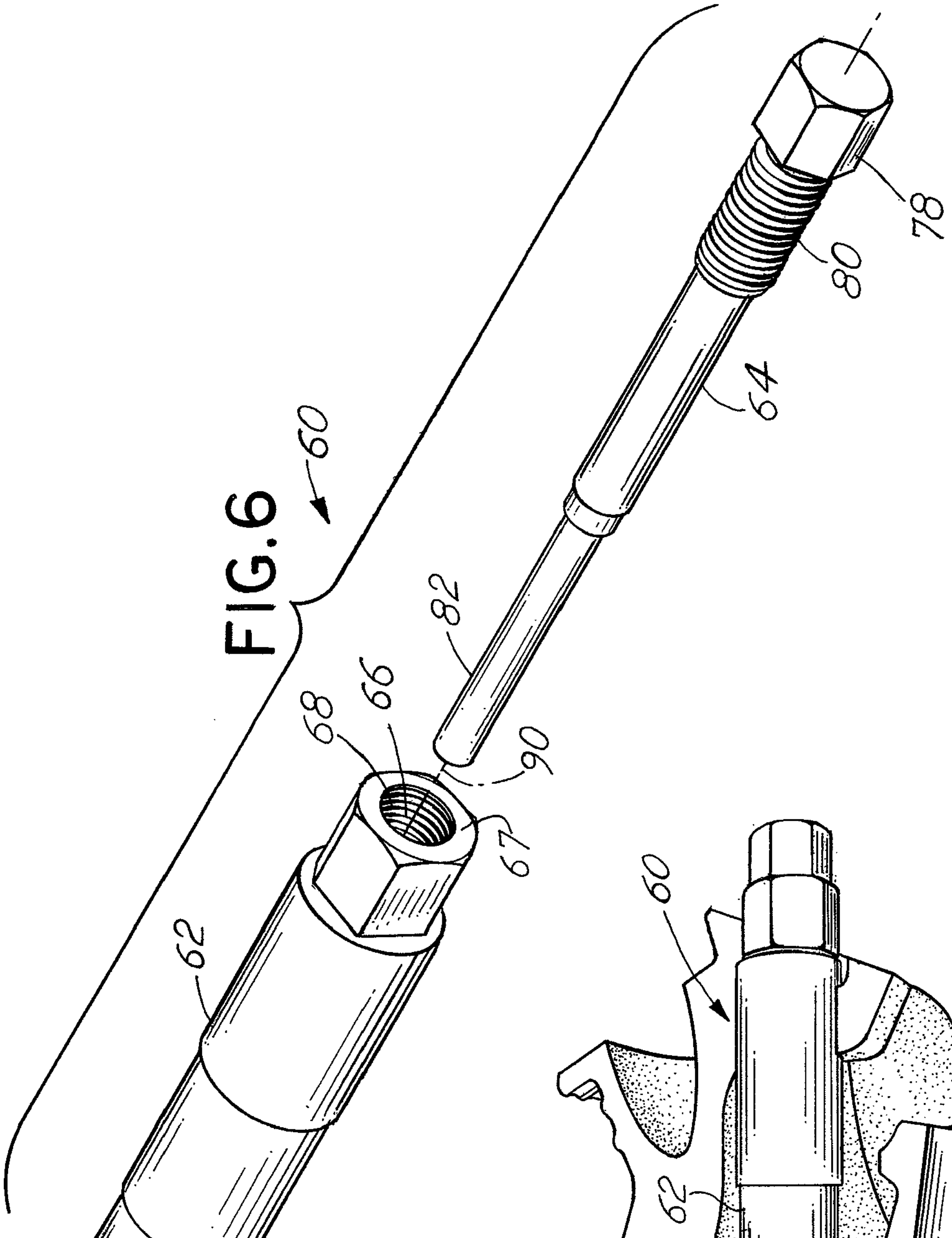
FIG. 6 is an exploded isometric view of the tool of FIG. 4.
Figure 7:
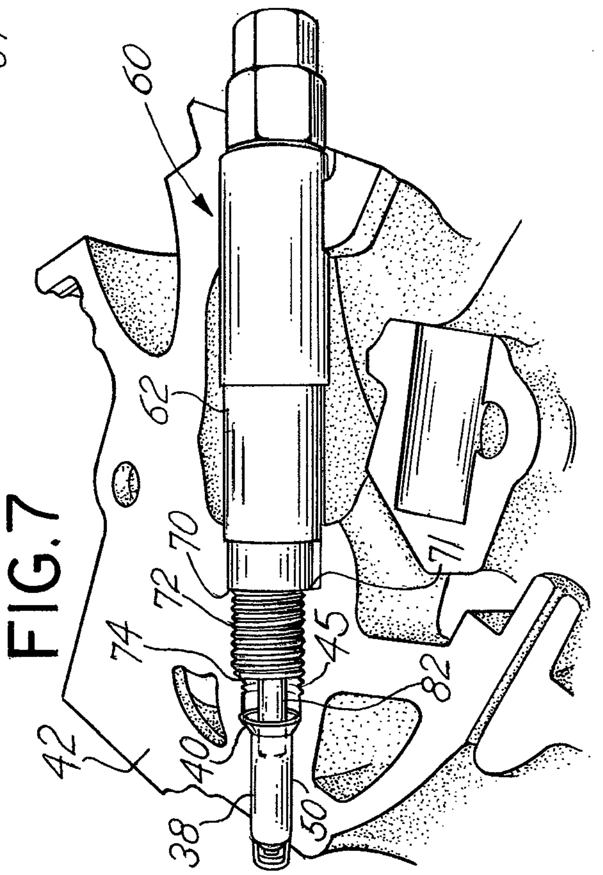
FIG. 7 illustrates the manner of positioning the tool of FIG. 4 within the cylinder head to engage and move the porcelain element into the spark plug tip.

An embodiment of the invention is depicted in the Figures. FIGS. 1-3 depict a spark plug construction of the type with which the kit of the invention is to be utilized for removal or extraction of a portion of the spark plug from a cylinder head. FIGS. 4-7 illustrate a first tool in the kit of the invention, including the manner of its use. FIGS. 8-11 illustrate the second tool of the kit of the invention including the manner of its use.

Referring therefore initially to FIGS. 1-3, there is illustrated a typical spark plug construction with which the kit may be used. Subsequent to a description of the spark plug, an embodiment of the invention is described; namely, the tools comprising a kit and the methodology of the use of the tools in conjunction with a spark plug generally of the type depicted in FIGS. 1, 2 and 3.

The spark plug 20 is typically comprised of multiple component parts. The plug 20 includes a ceramic or porcelain insulator 22 with an axial conductive lead or member 24 shielded by the porcelain insulator 22 and having a distributor wire contact 26 at an outer end and a spark gap element 28 at the inner or opposite end. The porcelain insulator 22 and attached axial conductor or wire element 24 are retained within an annular threaded outer body 30 with a hexagonal drive nut 32 at one end, and an adjacent threaded section 34. The annular outer body 30 is retained in position on the porcelain insulator 22 by means of a ring 36. The ring 36 fits over an annular or hollow, cylindrical, metal spark plug firing tip element 38 and retains that element 38. The ring 36 includes a land 40 that limits the insertion of the spark plug 20 into a cylinder head 42, and, more particularly, into a threaded spark plug bore or socket 44 of cylinder head 42. It is to be noted that the porcelain insulator 22 includes a porcelain tip section 46 which may be integral or separate and which fits into the spark plug firing tip 38. It is generally integral.

Insertion of a spark plug 20 of the type depicted into a cylinder head 42 is a very straightforward operation. Plug 20 is merely threaded into the plug socket 44 in head 42 and the land 40 limits the degree of insertion into the head 42 due to the fit with a compatible land 48 in the socket 44 of the head 42. Removal of the spark plug 20, however, is often accompanied by fracture of the porcelain insulator 22 and separation of a portion of the plug 20, namely the spark plug firing tip 38, and the porcelain insulator tip 46 from the remainder of the elements comprising the spark plug 20. Thus, there remains within the head 42, and more particularly, within the unthreaded section or socket 50 adjacent an engine cylinder of the bore 44, the elements comprised of the firing tip 38 and a section of the porcelain insulator tip 46. The kit of the present invention may be utilized to remove those broken elements from the unthreaded section 50 of bore 44 in the head 42.

Referring therefore to FIGS. 4-7, there is illustrated the first tool 60 of the kit, which is designed and utilized for positioning the porcelain insulator tip 46 fully within the spark plug firing tip 38 so that the second tool illustrated in FIGS. 8-11 may be utilized to effect removal of the firing tip 38 and porcelain insulator tip 46 from the engine block 42. The first tool 60 is comprised of two basic component parts, namely, a tubular pusher body 62, having a two part, axial pusher rod or screw 64 inserted therein. Thus the pusher body 62 includes an axial throughbore 66. The axial throughbore 66 is internally threaded at an outer end 68. The threaded section at the outer end 68 connects with a smooth bore section 69 that terminates with a land 70. The throughbore 66 continues axially and exits at the inner end 72 of the annular tubular body 62 which includes outer threads 73. That is, the inner end 72 of the tubular body 62 has a threaded cylindrical configuration with an end land 74 so that the tool 60 may be threadably inserted into the bore 44 in head 42 in place of the portion of the spark plug 20 previously removed therefrom. An annular flat surface 75 of body 62 seats on a land 71 of head 42 limiting insertion of the pusher tool or first tool 60 into the threaded bore 44.

The pusher rod 64 further includes a hex drive 78 at its outer end and a compatible threaded section 80 adjacent thereto, compatible with the threaded section 68 of the throughbore 66. The embodiment of the pusher rod 64 depicted includes a separate tip section 82 axially extending from rod 64 and projecting through the inner end 72 of the body 62 of the tool 60. Thus, upon rotation of the drive rod 64, by actuation of the drive 78, the rod 64 will be advanced axially to cause the tip 82 to move axially. The axial movement of rod 64 and thus tip section 82 is limited by hex header drive 78 which engages the outer top side, annular surface 67.

In use, the tool 60 is initially inserted and threaded into the bore 44 and surface 75 seats on land 71. The pusher rod 64 is then rotated in a manner which will engage the pusher tip section 82 against the porcelain insulator tip 46, driving that porcelain insulator tip 46 into the spark plug firing tip 38. Of course, the diameter and configuration of the pusher tip section 82 is such that it will fit into the interior of the spark plug firing tip 38. Typically the pusher tip section 82 has a diameter lesser than the internal diameter of the spark plug firing tip 38, but sized so as to engage the broken porcelain insulator tip 46 and drive that tip 46 into the spark plug firing tip 38. The head 78 engages surface 67 of body 62 and limits the degree of insertion of the pusher rod or screw 64. In the embodiment depicted, all of the elements comprising the pusher rod 64 as well as the annular body 62 are symmetrical about a longitudinal axis 90.

FIGS. 8-11 illustrate the construction and methodology of use of the second tool of the kit. Specifically, the second tool includes a hollow annular tube or tubular member 100. The tubular member 100 includes a uniform diameter axial throughbore 102, an inner end 104, defined by a land or stop surface which is annular, and an outer end 106. The tube 100 includes a circumferential annular flange at the outer end 106 having an annular flange surface 108 transverse to axis 109.

The inner end annular flange surface 104 is sized to fit against the land 71 of the head 42 and thus thereby limit the insertion of the hollow tube 100 into the head 42. The tube 100 is axially aligned in head 42 by a metal sleeve insert 103 in the axial passage of bore 44 joined to threaded section of bore 44. Thus the sizing, dimensions and configuration of the tube or hollow tubular 100 becomes somewhat important with respect to the utility of the second tool.

The second tool further includes a central or axial puller screw or rod 110. The puller screw or rod 110 includes an inner end 112 with threads 114 provided on the end 112. Further, the puller screw or rod 110 includes threads 116 at the outer end thereof, which have a pitch that will facilitate cooperation with a separate nut 118 to effect axial withdrawal of the rod 110 from the tube 100. The rod 110 of second tool further includes a hex drive 120 at its outer end adjacent to the threads 116. A nut 118 is threaded on threads 116 of rod 110 against a gasket 122 to facilitate smooth operation of the second tool.

Importantly, the threads 114 are of generally uniform pitch and formed on a frustoconical leading inner end 112 which has a lesser diameter at the extreme outer end of rod 110. The threads 114 are non-tapping or non-cutting threads to avoid formulation of shards that could fall into the cylinder of an engine. The threads thus have a taper of their crests in the range of 6°±1° and a crest width no greater than about 0.008 inch. This enables the threads to grip the inside of the hollow tip 38 without undue mechanical force and without altering the configuration of the tip 38 by causing it to expand.

The second tool is operated in the following manner. Initially, the body 100 of the tool is inserted into the unthreaded section of bore 44 of the head 42 and axially aligned therewith by virtue of a sleeve insert 103 in the head. The land 104 engages against the land 71 of bore 44 to limit the insertion of the tubular member 100. The puller screw or rod 110 is then inserted and rotated by actuation of the drive 120 to thread into the spark plug firing tip 38.

Subsequently, the nut 118 is rotated to engage the threads 116 and axially withdraw the puller screw or rod 110 with the attached spark plug firing tip 38 into the hollow tube 100. This results because the threads 116 associated with the puller rod 110. For example, the threads 116 and the threads 118 associated with the nut 118 may, for example, be left handed threads. In other words, the pitch or orientation of the tapping threads 114 as well as the pitch of the threads 116 of the puller rod 110 may be the same. Other pitch arrangements may be utilized, however, to effect the series of steps and operation of the second tool in the kit.

In sum, therefore, in order to remove a broken spark plug firing tip 38 and any porcelain insulator portion 46 retained within that tip 38, the first tool is utilized to properly prepare the firing tip 38 and insulator portion 46 in a manner which will enable utilization of the second tool. The first tool effects pushing of the porcelain insulator tip 46 into the spark plug firing tip 38. The second tool then engages the interior of the tip and axially removes the spark plug firing tip 38 and anything retained within that tip 38 from the section 50 of socket or bore 44.

It is possible to vary the construction and alter the features of the invention without departing from the spirit and scope thereof. For example, the positioning and pitch of the threads may be altered. The length and diameter of the various components may be altered in various ways while still maintaining the functionality described and providing the benefits of the invention. With the invention, the kit enables removal of broken spark plug elements from a cylinder head without adversely impacting or affecting the threads in the spark plug bore, and without causing binding or shearing or loss of spark plug component parts in the cylinder of the cylinder head. Thus, while it has been set forth an embodiment of the invention, it is understood that the invention is limited only by the following claims and equivalents thereof.

What is claimed is:

1. A spark plug removal kit for removal of a broken spark plug from a cylinder head spark plug bore, said spark plug of the type including a hollow cylindrical firing tip, a porcelain element at least partially recessed in the tip, and an externally threaded plug body, said kit comprising a first porcelain pusher tool and a second tip puller tool;

(a) said first tool including a hollow tubular body with an axial throughbore, an externally threaded inner end including threads compatible with a threaded section of the spark plug bore, and an internally threaded segment of said throughbore; and a separate pusher element comprising an axial elongate, generally straight rod in the throughbore with an inner push tip section sized to axially engage a porcelain element to push said porcelain element axially into said hollow cylindrical tip, said rod further including a threaded section compatible with the internally threaded segment of said hollow tubular body, and a drive at an outer end of the rod opposite the inner push tip section, said rod rotatable to axially advance the inner push tip section from the throughbore of the tubular body to engage the inner push tip section with the porcelain element; and (b) said second tool including a hollow tubular member having a cylindrical outer surface with an annular land at one end, said land sized to limit the insertion of the tubular member into a spark plug socket in a cylinder head, said tubular member further including an axial throughbore, said second tool further including a separate puller rod having an inner end with threads sized and shaped to fit into and engage the interior of a spark plug firing tip without cutting or forming metal shards, said puller rod further including an opposite outer end with threads, said puller rod including an outer drive end of said puller rod and a threaded nut on the outer end for seating against the outer end of the tubular member whereby the drive end may be rotated to thread the puller rod inner end into the firing tip and the nut may be rotated to axially withdraw the puller rod and an attached firing tip from a cylinder head.

2. The kit of claim 1 wherein said second tool includes an annular gasket on the puller rod intermediate the nut of the second tool and the outer end of the tubular member.

3. The kit of claim 1 wherein said first tool includes an annular circumferential land to limit axial entry of the annular body into a threaded spark plug section of a plug bore in a cylinder head.

4. The kit of claim 1 wherein said first tool includes a land to engage and limit axial movement of the pusher element.

5. The second tool of claim 1 wherein the puller rod threads and the outer end threads have substantially the same orientation.

6. The kit of claim 1 wherein the puller rod inner end with threads is generally frustoconical.

7. The kit of claim 1 wherein the puller rod inner end threads include a generally planar crest no greater than about 0.008 inches in axial diameter.

8. The kit of claim 1 wherein the puller rod inner end includes a frustoconical configuration forming an angle of about 6°±1° with a longitudinal axis of the puller rod.

9. A first tool for inserting a broken spark plug porcelain element into a hollow cylindrical firing tip in a cylinder head, said first tool comprising:

a hollow tubular body including an axial throughbore with an inner end and an outer end, an externally threaded segment of the, inner end said externally threaded segment including an end land for limiting thread insertion of the hollow tubular body in a cylinder head, and an internally threaded segment of the outer end of said throughbore, a first land on the inside of the throughbore intermediate the internally threaded segment and the inner end of the throughbore; and a pusher element comprising a separate inner push tip section and an axial, elongate generally straight rod axially moveable in the throughbore and a separate inner push tip section, said inner push tip section projecting from the inner end of the throughbore and sized to axially engage a porcelain element to push said porcelain element into said hollow, cylindrical tip, said straight rod further including a threaded section compatible with the internally threaded segment of said hollow tubular body, and a drive at an outer end of the rod opposite the inner push tip section, said straight rod moveable axially in said bore to advance the inner push tip section axially from the inner end of the throughbore of the tubular body to engage the porcelain element; and a second land surface at the outer end of the hollow tubular body to engage and limit axial movement of the rod.

10. A second tool for removal of a cylindrical firing tip from a cylinder head, said second tool comprising:

a hollow tubular member having a cylindrical outer surface with an annular land at an inner end, said land sized to limit the insertion of the tubular member into a spark plug bore in a cylinder head, said tubular member further including an axial throughbore an outer end and opposite the inner end;

said second tool further including a separate puller rod having an inner end with threads sized and shaped to fit into the interior of a spark plug firing tip without cutting or forming metal shards wherein the puller rod inner end with threads is generally frustoconical, said puller rod further including an opposite outer threaded end section, said puller rod including an outer drive end and a threaded nut on the outer threaded end section of said puller rod for seating against said outer end of the tubular member whereby the drive end;

a threaded nut may be rotated to thread the puller rod also into the firing tip and the nut may be rotated to axially withdraw the firing tip from a cylinder head bore.

11. The tool of claim 10 wherein said second tool includes an annular gasket on the puller rod intermediate the nut and the outer end surface of the tubular member.

12. The tool of claim 10 wherein the puller rod threads and the outer end threads have substantially the same orientation.

13. The tool of claim 10 wherein the puller rod inner end threads include a generally planar crest no greater than about 0.008 inches in axial diameter.

14. The tool of claim 10 wherein the puller rod inner end includes a frustoconical configuration forming an angle of about 6°±1° with a longitudinal axis of the puller rod.

15. A method for removal of a broken spark plug from a spark plug bore and socket in a cylinder head, said plug including a tubular firing tip with an inserted porcelain element comprising the steps of:

optionally initially pushing the porcelain element into the firing tip with a first tool as set forth in claim 1 by threading the first tool into the plug bore followed by rotating the pusher rod to engage the porcelain element and advance the porcelain element into the firing tip; and then removing the first tool from the plug bore; and subsequently positioning the second tool as set forth in claim 1 in said plug bore; rotating said drive of said puller rod to thread into said firing tip; manipulating said nut to withdraw said puller rod and firing tip axially from said plug bore; and removing said second tool and attached firing tip from the cylinder head.

16. A second tool for removal of a cylindrical firing tip from a cylinder head, said second tool comprising:

a hollow tubular member having a cylindrical outer surface with an annular land at an inner end, said land sized to limit the insertion of the tubular member into a spark plug bore in a cylinder head, said tubular member further including an axial throughbore and an outer end opposite the inner end, said second tool further including a separate puller rod having an inner end with threads sized and shaped to fit into the interior of a spark plug firing tip without cutting or forming metal shards wherein the puller rod inner end with thread include a generally planar crest no greater about 0.008 inches in axial diameter, said puller rod further including an opposite, outer threaded end section, said puller rod also including an outer drive end; and a threaded nut on the outer threaded end section of said puller rod for seating against an outer end surface of the tubular member whereby the drive end may be rotated to thread the puller rod into the firing tip and the nut may be rotated to axially withdraw the firing tip from a cylinder head bore.

17. The tool of claim 16 wherein the puller rod inner end with threads is generally frustoconical.

18. A second tool for removal of a cylindrical firing tip from a cylinder head, said second tool comprising:

a hollow tubular member having a cylindrical outer surface with an annular land at one end, said land sized to limit the insertion of the tubular member into a spark plug bore in a cylinder head, said tubular member further including an axial throughbore, said second tool further including a separate puller rod having an inner end with threads sized and shaped to fit into the interior of a spark plug firing tip without cutting or forming metal shards, said puller rod further including an opposite outer threaded end section, said puller rod including an outer drive end and a threaded nut on the outer threaded end section for seating against an outer end surface of the tubular member whereby the drive end may be rotated to thread the puller rod into the firing tip and the nut may be rotated to axially withdraw the firing tip from a cylinder head bore, said puller rod inner end including a frustoconical configuration forming an angle of about 6°±1° with a longitudinal axis of the puller rod.

* * * * *

UNITED STATES PATENT AND TRADEMARK OFFICE

CERTIFICATE OF CORRECTION

Figure 8:
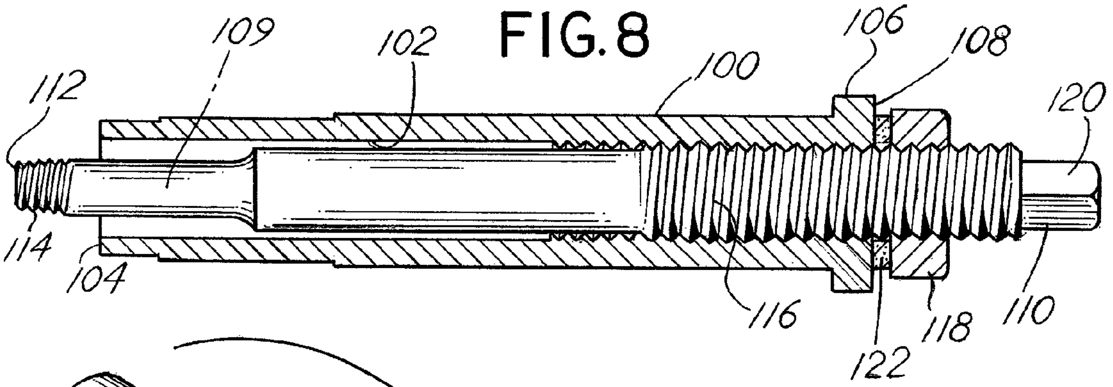
FIG. 8 is a cross-sectional view of the second tool of the kit which is used to remove the spark plug tip from the cylinder head.
Figure 10:
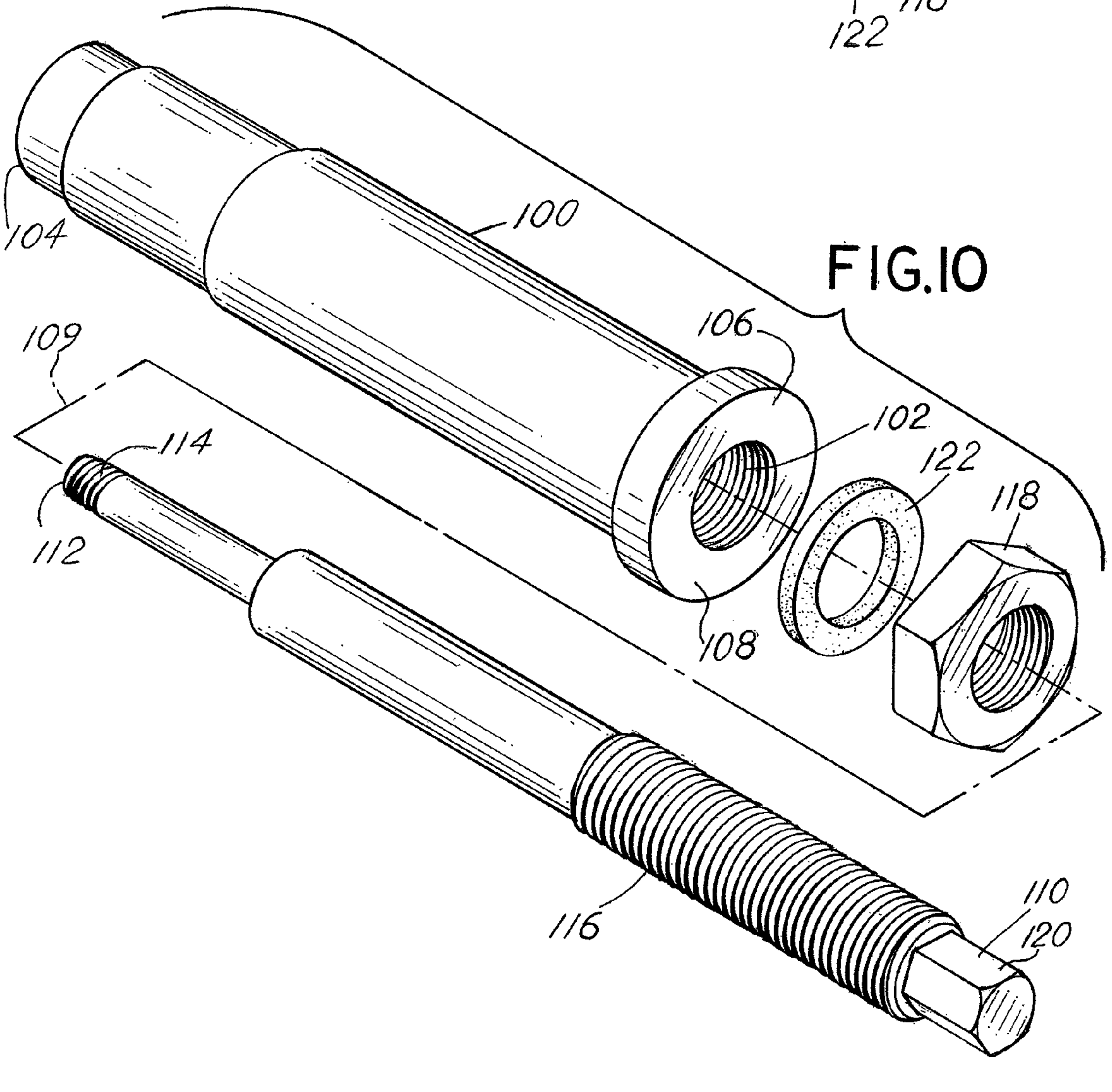
FIG. 10 is an exploded isometric view of the tool of FIG. 8.
Figure 9:
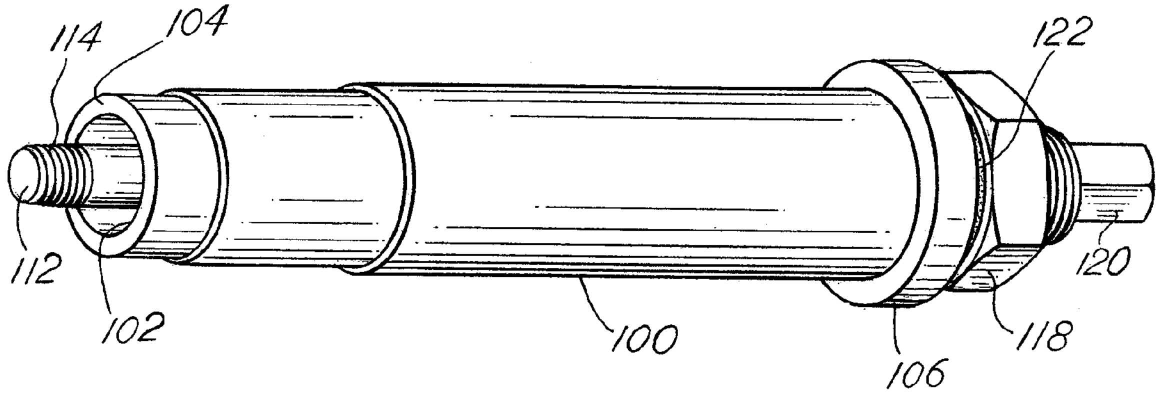
FIG. 9 is an isometric view of the tool of FIG. 8.
Figure 11:
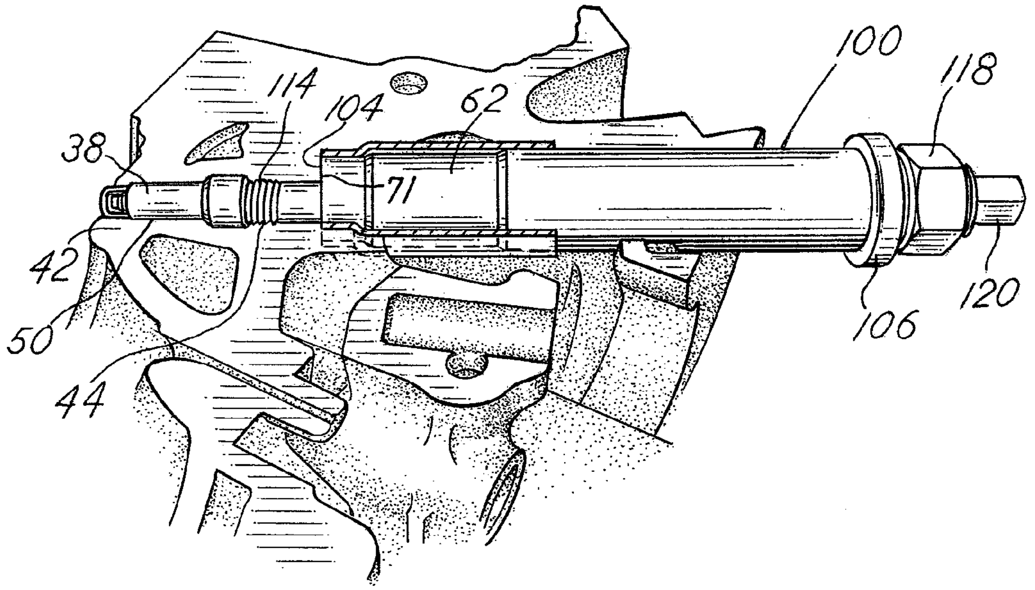
FIG. 11 is an isometric view illustrating the manner of use of the tool of FIG. 8.

PATENT NO. : 7,814,814 B2
APPLICATION NO. : 12/103240
DATED : October 19, 2010
INVENTOR(S) : Michael L. Whitehead It is certified that error appears in the above-identified patent and that said Letters Patent is hereby corrected as shown below:

In the Drawings:

Please substitute the attached Figures 8 and 10 which comprise Sheet 4 of 5.

Signed and Sealed this
Seventh Day of October, 2014

Michelle K. Lee
*Deputy Director of the United States Patent and Trademark Office*

FIG.8
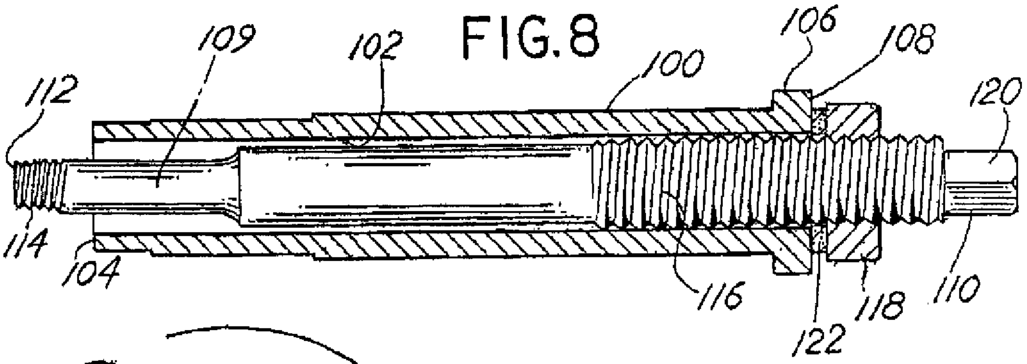
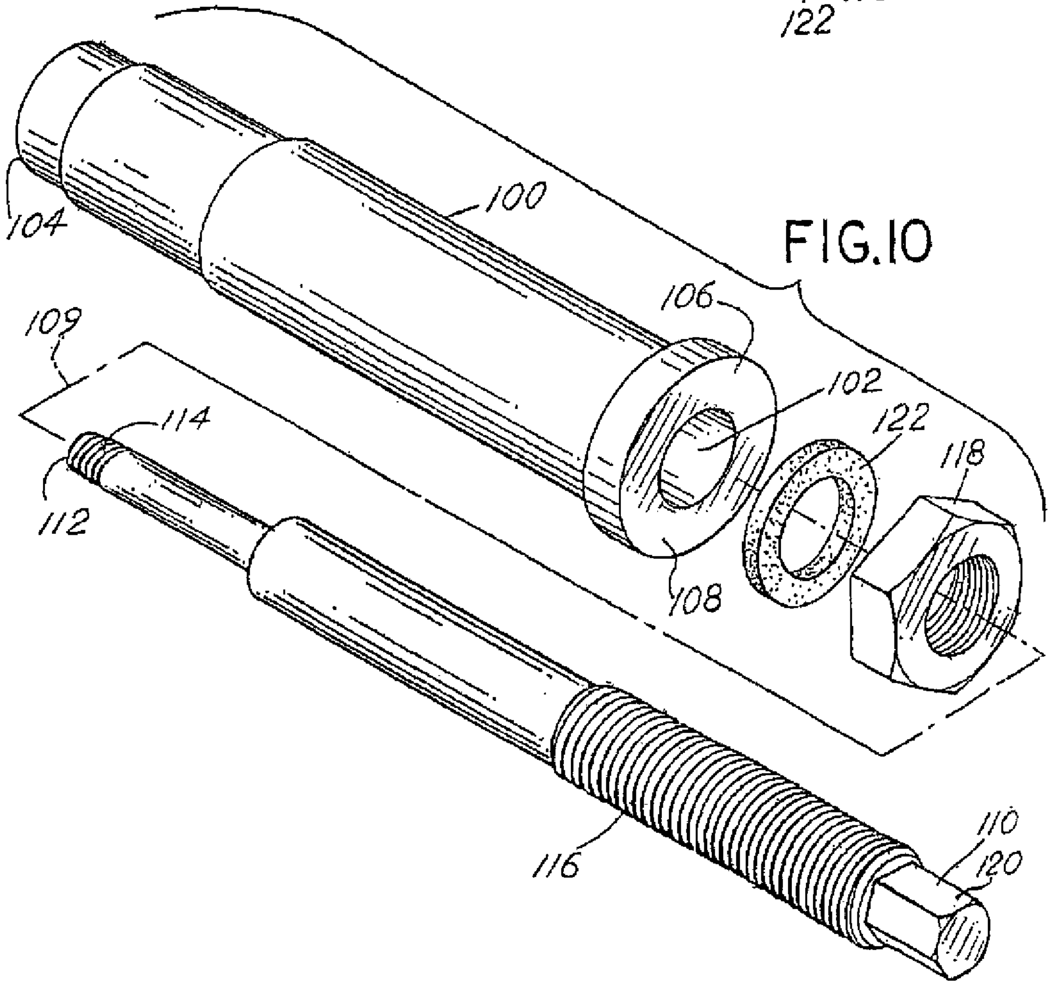
FIG.10